United States Patent [19]

King

[11] Patent Number: 5,589,743

[45] Date of Patent: Dec. 31, 1996

[54] INTEGRATED CRANKING INVERTER AND BOOST CONVERTER FOR A SERIES HYBRID DRIVE SYSTEM

[75] Inventor: Robert D. King, Schenectady, N.Y.

[73] Assignee: General Electric Company, Schenectady, N.Y.

[21] Appl. No.: 398,266

[22] Filed: Mar. 3, 1995

[51] Int. Cl.⁶ .................................................. B60L 11/08
[52] U.S. Cl. .......................... 318/139; 318/148; 318/151; 290/10; 322/17; 180/65.4
[58] Field of Search ..................................... 318/139, 140, 318/148, 151; 290/8–11, 14, 16, 18, 19, 47, 50; 322/17, 21–25; 180/65.1, 65.3, 65.4

[56] References Cited

U.S. PATENT DOCUMENTS

| | | |
|---|---|---|
| 3,758,836 | 9/1973 | Shibata . |
| 3,796,278 | 3/1974 | Shibata . |
| 4,862,009 | 8/1989 | King . |
| 5,214,358 | 5/1993 | Marshall ................................. 318/139 |
| 5,345,154 | 9/1994 | King . |

*Primary Examiner*—Bentsu Ro
*Attorney, Agent, or Firm*—Ann M. Agosti; Marvin Snyder

[57] ABSTRACT

An electric continuously variable drive system includes an ac motor, an alternator for supplying electrical power to the ac motor via a rectifier and an inverter, a heat engine for driving the alternator, an energy storage device for providing electrical energy to the electric continuously variable drive system, and a combination cranking inverter and boost converter. The combination cranking inverter and boost converter is coupled in series between the alternator and the energy storage device and coupled substantially in parallel with the rectifier in a series hybrid drive.

17 Claims, 6 Drawing Sheets

INTEGRATED CRANKING INVERTER AND BOOST CONVERTER FOR A SERIES HYBRID DRIVE SYSTEM

BACKGROUND OF THE INVENTION

1. Field of the Invention

This invention relates generally to electric drive systems and, more particularly, to a combination of a cranking inverter and a boost converter in a series hybrid drive system.

2. Description of the Related Art

Heat engine driven alternators for series hybrid vehicle drives produce significant emissions during cold and warm start-up using conventional dc cranking (starter) motors and normal engine controls.

As disclosed in commonly assigned King, U.S. Pat. No. 5,345,154, issued Sep. 6, 1994, which is herein incorporated by reference, a field-controlled multi-phase alternator coupled to a full bridge rectifier are useful as a series hybrid propulsion drive for a vehicle. During high power operations, including vehicle accelerations and while climbing grades, for example, the heat engine speed is necessarily high and the uncontrolled full bridge rectifier efficiently converts the high power alternator output signal from ac to dc. However, field-controlled multi-phase alternators typically do not have sufficient voltage control to permit battery charging at low to medium power levels while operating at low heat engine speeds and still minimize emissions and maximize fuel economy. In these systems, alternator field control limitations often require the heat engine to operate at higher speeds than is necessary to supply the desired power, and thus heat engine emissions and fuel economy are compromised during low to medium power level battery charging.

SUMMARY OF THE INVENTION

Accordingly, an object of the present invention is to provide a hybrid drive system which maximizes fuel economy while minimizing engine emissions. The object is achieved by connecting a three phase inverter in parallel with a three phase full bridge rectifier in a series hybrid drive system with a heat engine driven alternator so that the three phase inverter performs the function of both a cranking inverter and boost converter. A control system enables the cranking inverter/boost converter to operate in the series hybrid drive system with both high efficiency and low emissions during cold and warm engine start-ups, during low to medium powered charging of an energy storage device and propulsion from the heat engine, and during high powered vehicle driving operations. Furthermore, the system helps reduce the need for a conventional heat engine dc cranking/starter motor between a heat engine and a three phase alternator, and the system uses the heat engine's compression to dissipate excess regenerative braking power.

Briefly, in accordance with a preferred embodiment of the invention, an electric continuously variable drive system comprises an ac motor; an alternator for supplying electrical power to the ac motor via a rectifier and an inverter; a heat engine for driving the alternator; an energy storage device for providing electrical energy to the electric continuously variable drive system and receiving energy during regenerative braking; and a combination cranking inverter and boost converter. The combination cranking inverter and boost converter is coupled in series between the alternator and the energy storage device and coupled substantially in parallel with the rectifier in a series hybrid drive.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
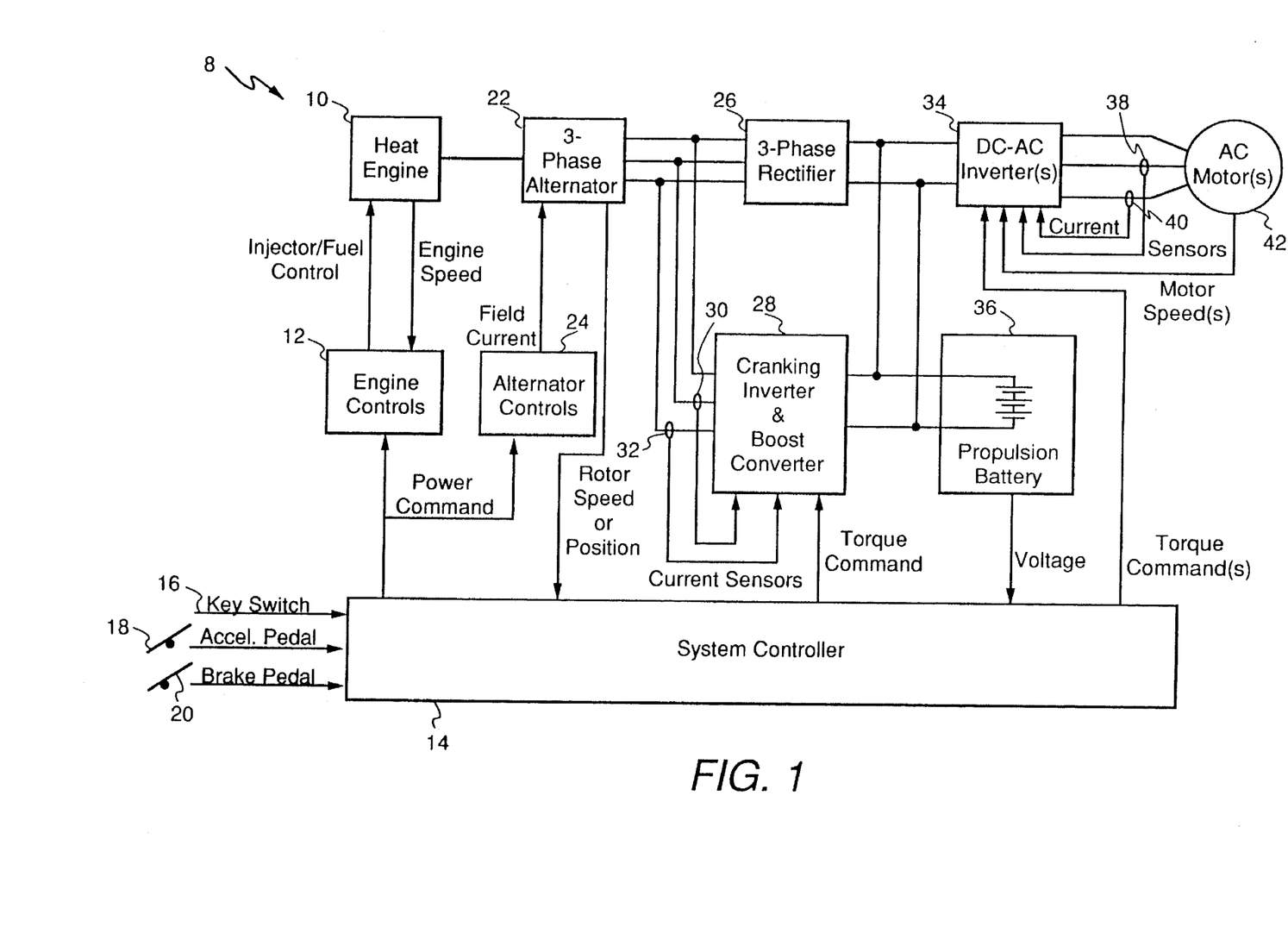
FIG. 1 is a block diagram of a cranking inverter/boost converter and associated control functions within a hybrid series drive.

FIG. 1 is a block diagram of a cranking inverter/boost converter and associated control functions within a hybrid series drive system 8. As disclosed in aforementioned U.S. Pat. No. 5,345,154, a heat engine 10 with associated engine controls 12 directly operates a multi-phase alternator 22 with associated alternator controls 24 that supplies power to an electric continuously variable transmission including a three-phase rectifier 26 and three phase dc-ac inverter 34 for driving at least one ac motor 42 through a differential to multiple wheels in an automobile, bus, or truck. Alternatively, there may be a plurality of inverters 34 with each inverter coupled to a respective one of a plurality of motors 42. The inverter and the AC motor form a propulsion drive. The drive system is responsive to signals from a key switch 16, an acceleration pedal 18, and a brake pedal 20. A heat engine control 12 operates in a closed-loop power mode, along with the inverter 34 that receives its control from the system controls 14, and decouples heat engine speed from motor speed. An energy storage device (e.g., a battery, flywheel, ultracapacitor, superconducting magnetic energy storage device, or combination thereof) provides electrical energy to the electric drive system during vehicle accelerations and further reduces peak power demands on the heat engine. By way of example only, the energy storage device will be referred to herein as high voltage traction propulsion battery 36. High voltage traction batteries typically have a voltage rating of about 300 volts. Energy is recovered during vehicle deceleration and braking as disclosed in aforementioned U.S. Pat. No. 5,345,154, and the recovered energy is used to partially recharge the battery.

Figure 2:
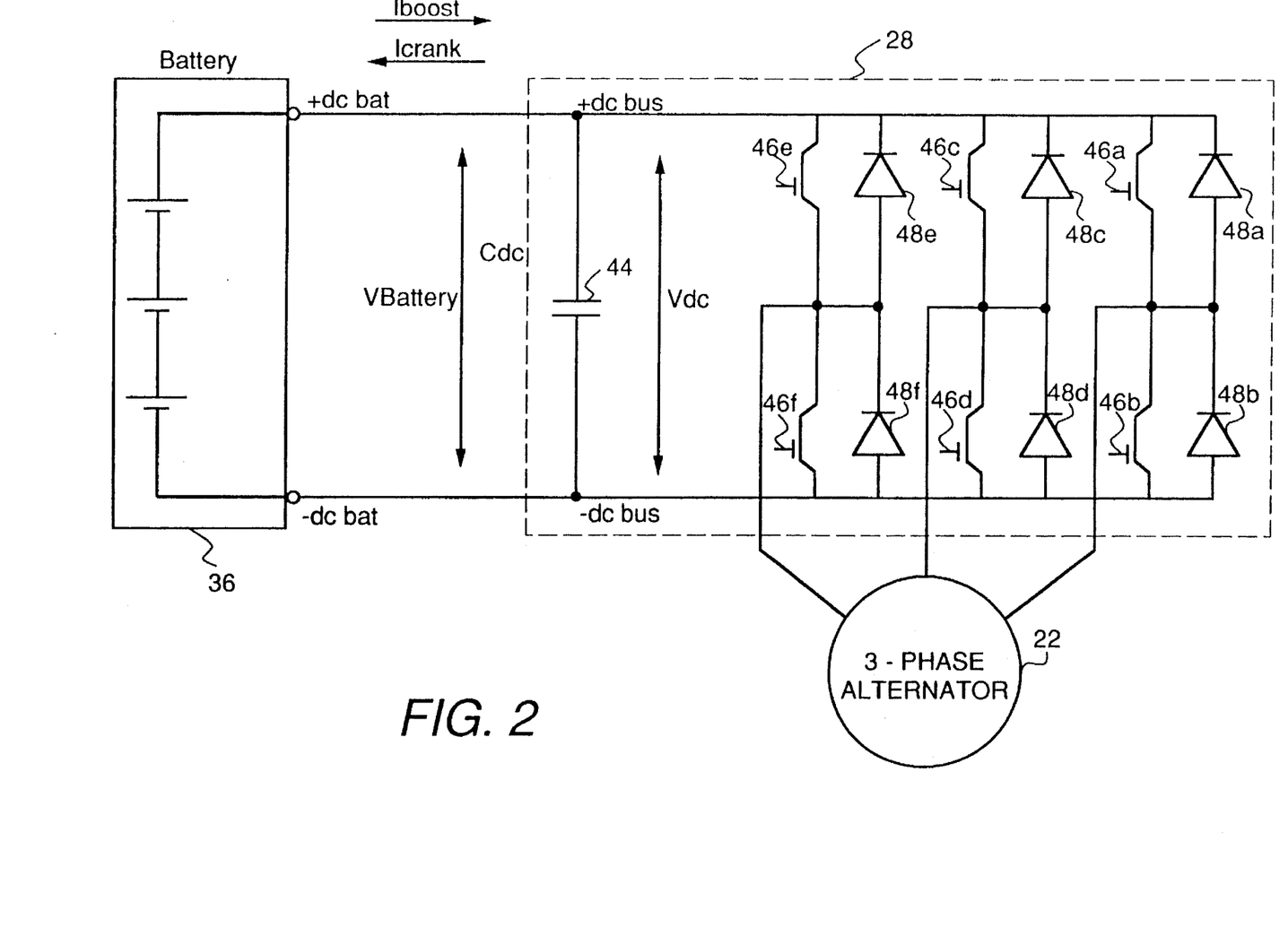
FIG. 2 is a circuit diagram of the cranking inverter/boost converter of FIG. 1.

According to the present invention, a combination of a cranking inverter and a boost converter (CI/BC) 28 is coupled in series with battery 36 to alternator 22 and substantially in parallel with rectifier 26. FIG. 2 is a circuit diagram of CI/BC 28 which includes inverter circuitry with a capacitor 44, a matrix of electronic switches which are shown in FIG. 2 for illustrative purposes as field effect transistors (FETs) 46a, 46b, 46c, 46d, 46e, and 46f, and a matrix of diodes 48a, 48b, 48c, 48d, 48e, and 48f. The invention is not limited to FETs. Any appropriate electronic switch can be used, such as, for example, insulated gate bipolar transistors (IGBTs), metal oxide semiconductor field effect transistors (MOSFETs), bipolar junction transistors (BJTs), and metal oxide semiconductor controlled thyristors (MCTs). As shown in FIG. 2, each respective pair of electronic switch and diode forms a respective half phase module with two half phase modules per respective phase of the three-phase inverter. The CI/BC is bi-directional in that dc power from the high voltage traction battery is inverted by the cranking inverter portion of the CI/BC to multi-phase ac-power while cranking the engine, and ac power is converted to dc by the boost conversion portion of the CI/BC during low to medium power levels battery charging and propulsion.

During heat engine cranking (starting), dc power from the propulsion battery is inverted by CI/BC 28 to frequency and current multi-phase ac power values which are adjustable by controlling the electronic switches (in one example by triggering the gates of the transistors), and thus provides the proper excitation of the multi-phase electric machine (alternator) to produce torque to crank the heat engine. The alternator controls 24 provide field excitation to the alternator while it is stationary, prior to cranking, and during cranking, and thus cause the alternator to act as a cranking motor. Rotor position or speed for some alternators can be sensed by a sensor such as a tachometer, for example, and used by the alternator controls. Current sensors 30 and 32 of FIG. 1 can be positioned in the ac phase windings for controlling and providing overcurrent protection of CI/BC 28, and current sensors 38 and 40 for controlling and providing overcurrent protection for dc-ac inverter 34. The engine controls 12 can send a heat engine power command in a similar manner as disclosed with respect to aforementioned U.S. Pat. No. 5,345,154. Because the heat engine cranking in this embodiment is powered from the high voltage traction battery 36, a conventional starting, lighting, and ignition (SLI) battery which is typically a 12 v or 24 v battery coupled to the starter, ignition, and lights, can either be down-sized or potentially eliminated. Therefore, the present invention is useful as a cranking inverter even if the boost converter portion of CI/BC 28 is not used.

After the engine controls detect that heat engine 10 has started and is running, CI/BC 28 can be used as a boost converter to supply power for low to medium power level battery charging and/or propulsion by the drive system. Battery charging occurs when the engine is idle and the vehicle is stationary and also when the vehicle is moving but has extra power present in the system. The converter operates in a pulse Width modulation mode by selectively controlling the electronic switches, and the alternator's multi-phase sine wave output is thus converted or boosted to a higher dc link voltage than can be obtained from an uncontrolled full bridge rectifier. Thus, using the boost converter, the heat engine is allowed to operate at a speed that minimizes the emissions and fuel consumption for the commanded power level, and is not required to operate at high engine speed to overcome the voltage control limitations of the field-controlled alternator as in conventional techniques. This is an advantage over conventional engine-driven alternators that change the dc link voltage using field control and have the limitation that the battery dictates voltage. The boost converter of the present invention provides flexibility so that the engine can run slower with the voltage boosted by the boost controller when needed.

During high power propulsion and battery charging operations, the heat engine runs at high speeds to produce the commanded power, so the field-controlled alternator has sufficient voltage control and the boost converter can therefore be disabled by turning off the electronic switches. Diodes 48a, 48b, 48c, 48d, 48e, and 48f preferably comprise anti-parallel diodes across the electronic switches of the disabled inverter/boost converter and form an uncontrolled full bridge rectifier that is substantially in parallel with the high power three-phase bridge rectifier 26. The high power full three-phase bridge rectifier provides an efficient ac to dc conversion while reducing the power rating of the more costly CI/BC power electronic switches. The words "substantially in parallel" are meant to encompass the situation wherein an electronic device, such as, for example, an inductor or resistor, is used between CI/BC 28 anti rectifier 26.

During the regenerative braking operations, the propulsion drive(s) follows negative torque command(s) and the drive motor(s) 42 become multi-phase alternators. When the regenerative power exceeds the losses in the propulsion motor(s) and inverter(s), the dc link voltage increases and is used to at least partially recharge the propulsion battery 36. At high levels of regenerative braking and when the propulsion battery is at high state of charge, excess power may have to be dissipated in a dynamic braking resistor (not shown), as described in aforementioned U.S. Pat. No. 5,345,154, to avoid an overvoltage condition. Control of the cranking inverter during regenerative braking to supply some regenerative power to the alternator through the heat engine's compression reduces the power rating of the dynamic brake resistor in the series hybrid drive system.

Power electronic component sizing of the cranking inverter/boost converter is based on a combination of voltage, current, and thermal requirements. If the heat engine is an internal combustion piston engine, the cranking torque requirement will be the dominant parameter that will dictate the size of the power electronic switches (shown as FETs 46a–46f). The peak cranking torque specification at a locked rotor condition will effectively determine the peak current requirement in the cranking inverter's power electronic switches. For a specified engine peak cranking torque and a given value of the dc link system voltage, the current rating of the cranking inverter power electronic switches can be reduced by the addition of a mechanical speed multiplier between the heat engine and the alternator, as discussed below.

Figure 3:
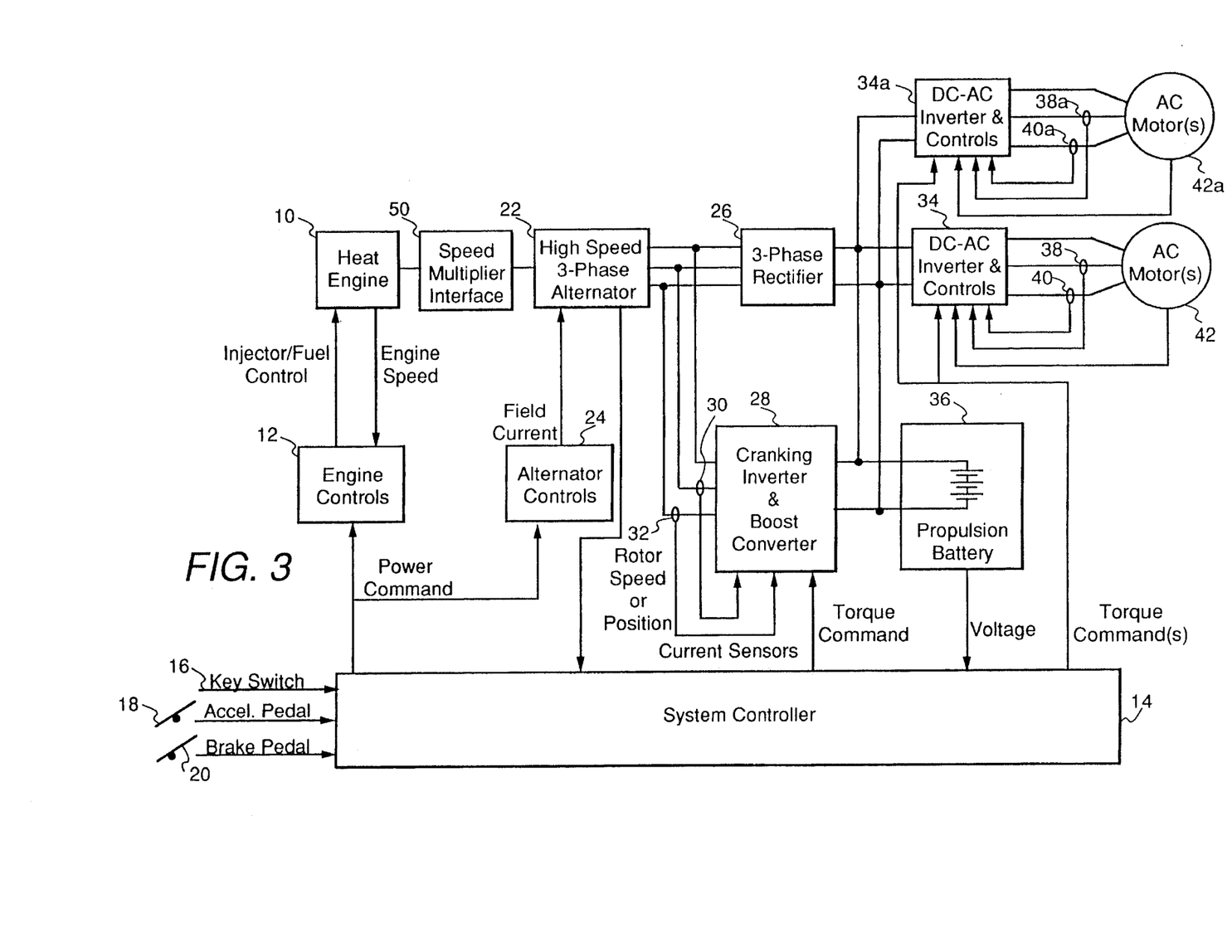
FIG. 3 is a block diagram similar to that of FIG. 1, with a high speed alternator and a speed multiplier interface.

FIG. 3 is a block diagram similar to that of FIG. 1, including multiple inverters 34 and 34a and multiple respective motors 42 and 42a and further including a high speed alternator 22 and a speed multiplier interface 50. The speed multiplier interface between the heat engine and high speed alternator can comprise, for example, either a fixed mechanical speed ratio device (with or without a clutch) or a variable ratio device with a clutch. A speed multiplier interface is not required when an alternator itself has a built-in speed multiplier. A high speed alternator is an alternator that operates at speeds higher than speeds of the heat engine.

Figure 4:
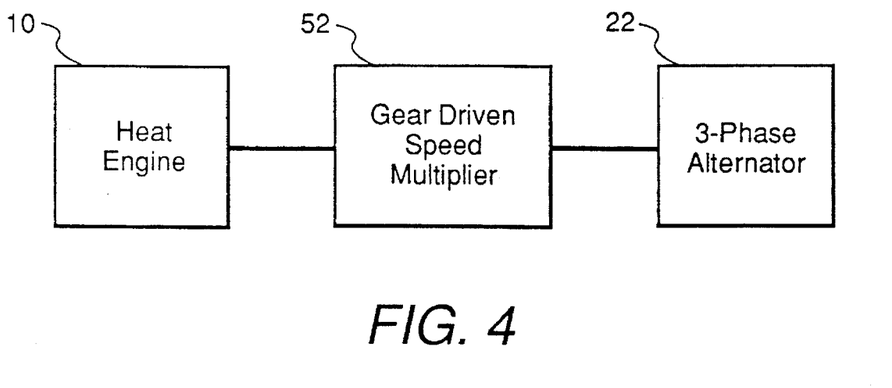
FIGS. 4–9 are block diagrams of high speed alternator/heat engine configurations for use with the cranking inverter/boost converter of the present invention.

FIGS. 4–9 are block diagrams of high speed alternator and heat engine configurations for use with CI/BC 28. FIG. 4 illustrates a gear driven speed multiplier 52 with a fixed gear ratio to operate the alternator 22 at a higher speed than the heat engine 10.

Figure 5:
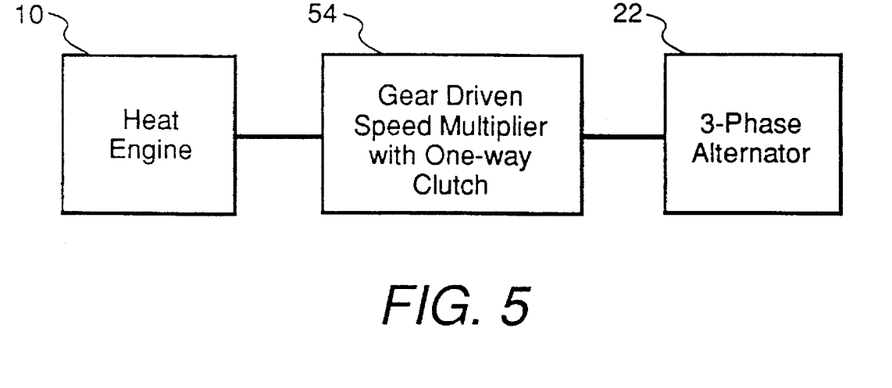

FIG. 5 illustrates a gear driven speed multiplier 54 with a one-way clutch. The embodiment provides for a high gear ratio during engine cranking that minimizes the current rating of the power electronic switches in the cranking inverter, and a lower gear ratio while the engine is running and driving the alternator 22 for battery charging and/or propulsion, as described in commonly assigned King, U.S. Pat. No. 4,862,009, issued Aug. 29, 1989, which is herein incorporated by reference.

Figure 6:
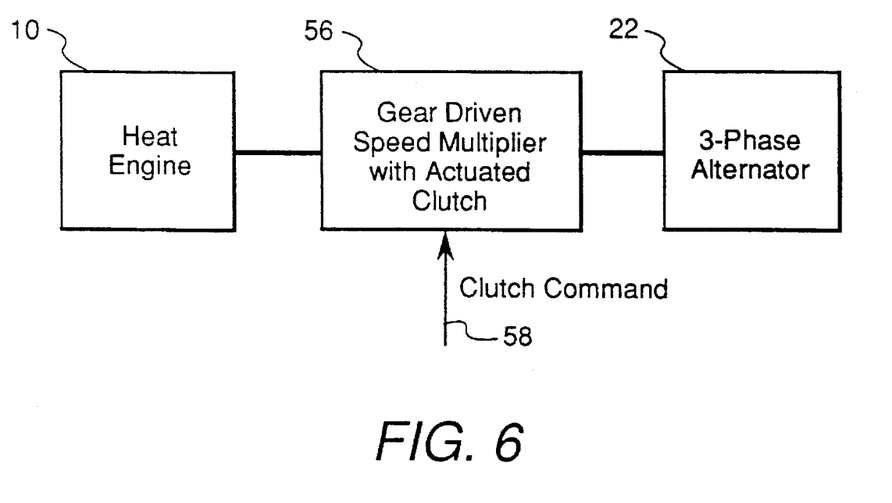

FIG. 6 illustrates an embodiment similar to that of FIG. 5 except that gear driven speed multiplier 56 in FIG. 6 has an actuated clutch that can be actuated by a command 58 from the system controller.

Figure 7:
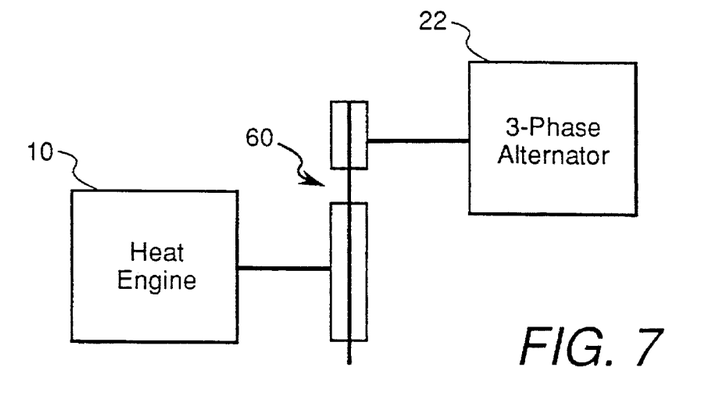

The configuration FIG. 7 is similar to that of FIG. 4 with the fixed ratio gear driven speed multiplier replaced with either a belt or chain drive 60.

Figure 8:
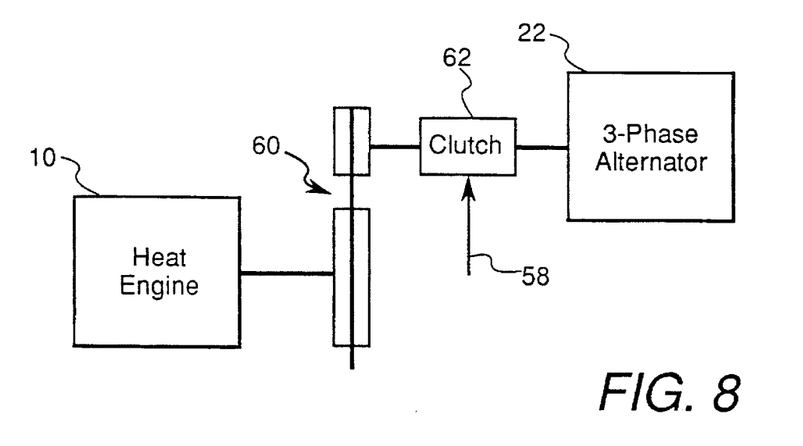
Figure 9:
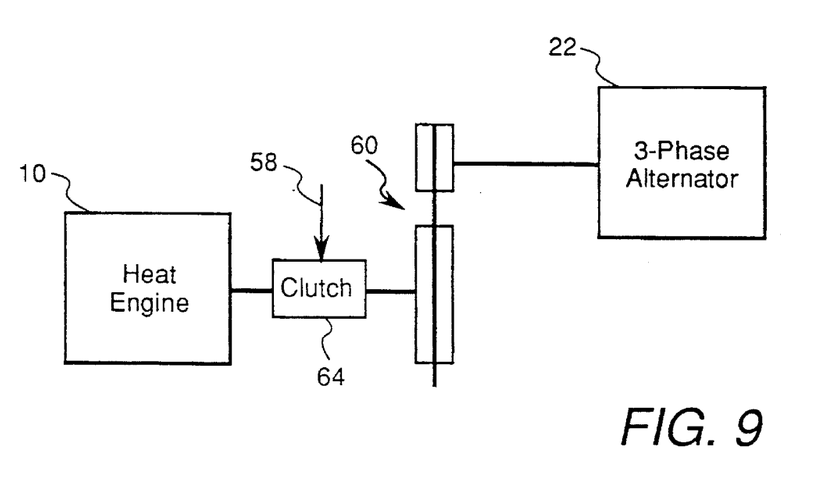

FIG. 8 illustrates an embodiment similar to that shown in FIG. 7 except that a clutch 62 actuated by a clutch command 58 allows heat engine 10 to be de-coupled from the high speed alternator. In FIG. 8, the clutch is positioned between the speed multiplier and the alternator. FIG. 9 illustrates an embodiment similar to that of FIG. 8 wherein the clutch 64 is located between heat engine 10 and speed multiplier 60. A high speed clutch having low torque capacity would be appropriate in the embodiment of FIG. 8, whereas a low speed clutch having high torque capacity would be more appropriate in the embodiment of FIG. 9.

The embodiments shown in FIGS. 6, 8, and 9 with respective actuated clutches 56, 62, and 64 allow the alternators 22 to be de-coupled or "free-wheel" from heat engine 10 when the clutch is not actuated. Appropriate sizing of these clutches allows a further reduction in the current rating of the cranking inverter power electronic switches. Peak engine cranking torque is required when the engine is stationary at the start of the cranking operation. During the engine cranking operation, the system controller (shown in FIG. 3) delays the clutch actuation command 58 until the cranking inverter accelerates the high speed alternator 22 to a given speed. Initial engine cranking is accomplished by closing the clutch and using some of the kinetic energy stored in the rotor of the rotating alternator. After clutch closure, the engine begins to rotate while the cranking inverter supplies excitation to the alternator that produces torque and continues to accelerate the heat engine. This approach will significantly reduce the peak current requirement on the cranking inverter power electronic switches. Reduction of the time required to start and stop the heat engine is an additional benefit of the actuated clutch configurations with high speed alternators using the novel CI/BC.

This is a significant improvement over conventional engine-driven alternators that run continuously and have no provision for engine on-off mode of operation. It is expected that a heat engine with a drive system of the present invention can start up and shut down up to 10 times per mile.

Figure 10:
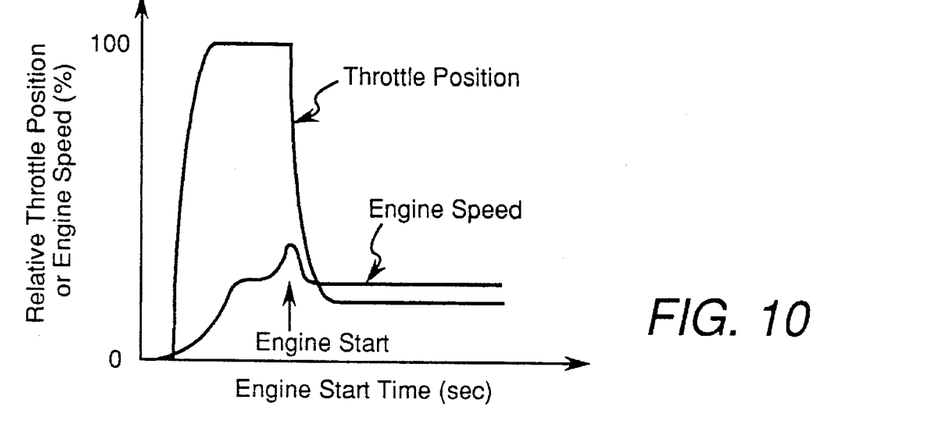
FIGS. 10–11 are graphs illustrating expected heat engine speed and throttle positions during cranking and start-up using a conventional starting motor and using a starting motor of the present invention, respectively.
Figure 11:
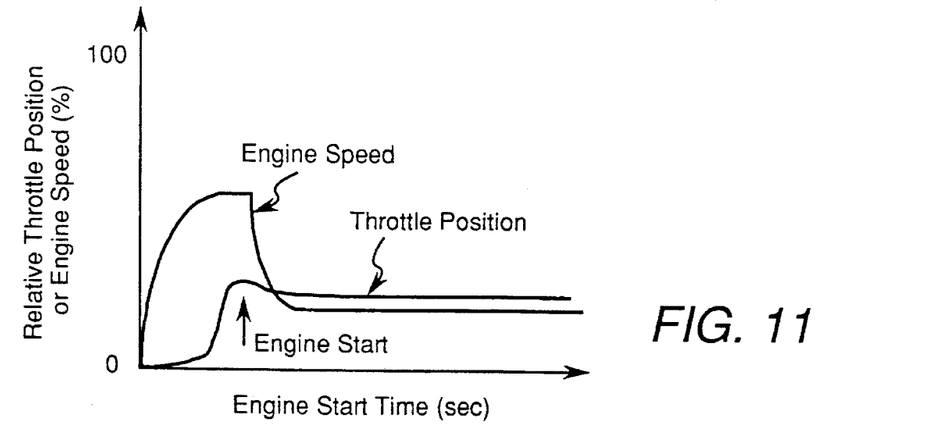

FIGS. 10-11 are graphs illustrating expected heat engine speeds and throttle positions (or injector duty cycles) during cranking and start-up using a conventional starting motor and using a starting motor of the present invention.

FIG. 10 illustrates a heat engine speed and throttle position during cranking and start-up using adc cranking motor as described in aforementioned U.S. Pat. No. 5,345,154. That dc cranking (starter) motor with a large gear reduction (typically 10:1) generally cranks the engine at only a fraction of the maximum engine speed (10%–30%). Throttle position, or injector duty cycle, can be quite high during the engine cranking process, and therefore significant emissions are generated during this operation.

FIG. 11 illustrates an expected heat engine speed and throttle position during cranking and start-up using the alternator/cranking inverter of the present invention. This system can easily be designed to crank the engine at high speeds (50%–100% of rated engine speed) with precise control of the throttle position, or injector duty cycle profile, to significantly reduce the emissions during engine cold and warm starting.

Figure 12:
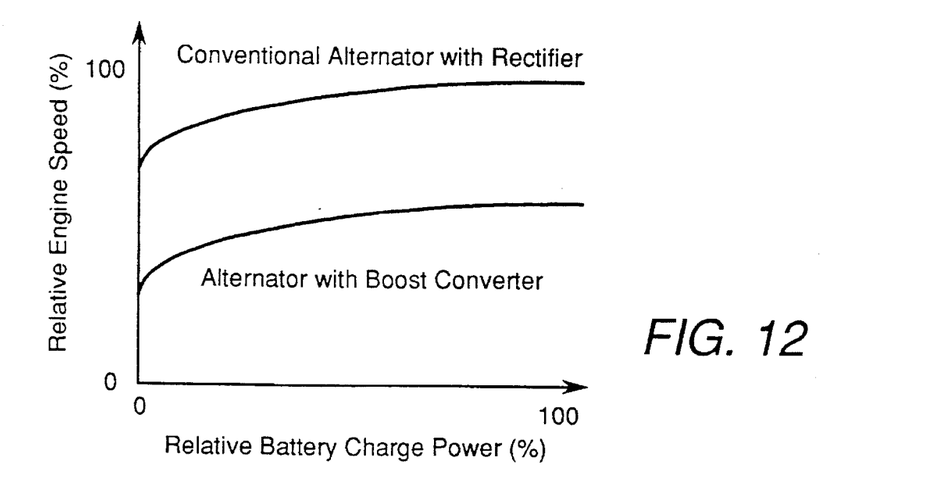
FIG. 12 is a graph illustrating the expected relative heat engine speed versus the relative battery charge power for a conventional alternator with a rectifier and for a drive system of the present invention.

The boost converter allows a hybrid drive system to perform low to medium power level battery charging and propulsion at heat engine speeds selected to minimize emissions and fuel consumption. FIG. 12 is a graph illustrating the expected relative heat engine speed versus the relative battery charge power for a conventional alternator with a rectifier and for a drive system of the present invention. As shown, the conventional system is forced to operate at higher engine speeds than the system with the boost converter.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electric continuously variable drive system, comprising:
   an ac motor;
   an alternator for supplying electrical power to the ac motor via a rectifier and a drive inverter;
   a heat engine for driving the alternator;
   an energy storage device;
   a combination cranking inverter and boost converter, the combination coupled in series between the alternator and the energy storage device and coupled substantially in parallel with the rectifier in a series hybrid drive.

2. The drive system of claim 1, wherein the combination cranking inverter and boost converter comprises a system cranking inverter capable of serving as a boost converter.

3. The drive system of claim 2, wherein the alternator comprises a three-phase alternator and the system cranking inverter comprises six pairs of electronic switches and diodes, each pair having one respective switch and one respective diode coupled in parallel, each phase of the three-phase alternator coupled to two respective pairs.

4. The drive system of claim 3, wherein each diode comprises an anti-parallel diode and each switch comprises a device selected from the group consisting of field effect transistors, insulated gate bipolar transistors, metal oxide semiconductor field effect transistors, bipolar junction transistors, and metal oxide semiconductor controlled thyristors.

5. The drive system of claim 1, wherein the alternator comprises a high speed alternator.

6. The drive system of claim 1, further including a speed multiplier coupling the heat engine to the alternator.

7. The drive system of claim 6,, wherein the speed multiplier comprises a mechanical speed multiplier selected from the group consisting of a gear, a chain, and a belt.

8. The drive system of claim 6, further including a controlled clutch mounted on the alternator side of the speed multiplier.

9. The drive system of claim 6, further including a controlled clutch mounted on the engine side of the speed multiplier.

10. An electric continuously variable drive system, comprising:

an ac motor;

an alternator for supplying electrical power to the ac motor via a rectifier and a drive inverter;

a heat engine for driving the alternator;

an energy storage device;

a cranking inverter coupled in series between the alternator and the energy storage device and coupled substantially in parallel with the rectifier in a series hybrid drive for cranking and starting the heat engine.

11. The drive system of claim 10, wherein the alternator comprises a high speed alternator.

12. The drive system of claim 10, further including a speed multiplier coupling the heat engine to the alternator.

13. The drive system of claim 12, wherein the speed multiplier includes a controlled clutch.

14. The drive system of claim 12, further including a controlled clutch mounted on the alternator side of the speed multiplier.

15. The drive system of claim 12, further including a controlled clutch mounted on the engine side of the speed multiplier.

16. An electric continuously variable drive system, comprising:

an ac motor;

an alternator for supplying multi-phase electrical power to the ac motor via a rectifier and a drive inverter;

a heat engine for driving the alternator;

an energy storage device;

a boost converter coupled in series between the alternator and the energy storage device and coupled substantially in parallel with the rectifier in a series hybrid drive for receiving multi-phase electrical power from the alternator and controlling dc output voltage during battery charging and propulsion in the series hybrid drive.

17. The drive system of claim 16, wherein the boost converter is adapted to control battery charging while the drive system supplies electrical power to the ac motor.

\* \* \* \* \*